United States Patent
Maheswari et al.

(10) Patent No.: US 11,502,916 B1
(45) Date of Patent: Nov. 15, 2022

(54) SYSTEM, METHOD, AND COMPUTER PROGRAM FOR AWS AUTOSCALING OF TUXEDO SYSTEMS

(71) Applicant: Amdocs Development Limited, Limassol (CY)

(72) Inventors: Yogesh Maheswari, Pune (IN); Abhishek Gupta, Pune (IN); Sujit Samantaray, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/669,161

(22) Filed: Feb. 10, 2022

(51) Int. Cl.
| | |
|---|---|
| *H04L 41/00* | (2022.01) |
| *H04L 47/125* | (2022.01) |
| *H04L 61/10* | (2022.01) |
| *H04L 61/3015* | (2022.01) |
| *H04L 61/4511* | (2022.01) |

(52) U.S. Cl.
CPC ............ *H04L 41/20* (2013.01); *H04L 47/125* (2013.01); *H04L 61/10* (2013.01); *H04L 61/3015* (2013.01); *H04L 61/4511* (2022.05)

(58) Field of Classification Search
CPC ........................... H04L 61/10; H04L 61/3015
See application file for complete search history.

(56) References Cited

U.S. PATENT DOCUMENTS

2007/0130316 A1* 6/2007 Turakhia ................ G06Q 30/02
709/224

OTHER PUBLICATIONS

"Amazon EC2 Auto Scaling User Guide", Amazon, docs.aws.amazon.com, Apr. 2020 (Year: 2020).*
"Oracle Tuxedo Introducing Oracle Tuxedo ATMI 10g Release 3 (10.3)", Oracle, docs.oracle.com, Jan. 2009 (Year: 2009).*
"Oracle Tuxedo Product Overview 12c Release 1 (12.1.1)", Oracle, docs.oracle.com, Jun. 2012 (Year: 2012).*

* cited by examiner

*Primary Examiner* — Nicholas P Celani
(74) *Attorney, Agent, or Firm* — Zilka-Kotab, P.C.

(57) ABSTRACT

As described herein, a system, method, and computer program are provided for AWS autoscaling of Tuxedo systems. In use, an AWS cloud based deployment of a Tuxedo system is identified. Further, autoscaling of the Tuxedo system is provided in accordance with an autoscaling configuration of the AWS, using a Tuxedo registrar that maps AWS EC2 DNS names or internet protocol (IP) addresses with Tuxedo-compliant names capable of being used by the Tuxedo system.

19 Claims, 7 Drawing Sheets

SYSTEM, METHOD, AND COMPUTER PROGRAM FOR AWS AUTOSCALING OF TUXEDO SYSTEMS

FIELD OF THE INVENTION

The present invention relates to Amazon Web Services™ (AWS) cloud deployment of a BEA™ Tuxedo™ system.

BACKGROUND

There are systems that uses BEA Tuxedo for middleware, given its processing and scalability features. In particular, the Tuxedo system handles massive transactions and is resilient. However, the Tuxedo system still uses native protocols, such as Jolt Server Listener (JSL) or Jolt, which is heavily embedded in application software. With cloud platforms, one of the best features is scaling, including in particular the autoscaling and autohealing of AWS. Unfortunately, the philosophy of Tuxedo and the philosophy of the Cloud differ given different generation of software. For instance, in AWS the domain name server (DNS) name of a cloud resource can have both alphanumeric and special symbols, but a Tuxedo configuration expects alphanumeric names only. Any Tuxedo server configured with AWS names fails to process as the AWS DNS nomenclature contains special characters.

As indicated above, the Cloud allows for dynamic scaling that happens automatically, whereas Tuxedo does not allow dynamic scaling intuitively. Tuxedo can be scaled but it is static and will not follow the cloud scaling. Accordingly, the AWS cloud deployment of Tuxedo clusters cannot use autoscaling and autohealing in its current form.

There is thus a need for addressing these and/or other issues associated with the prior art. For example, what is needed is a mechanism to allow Tuxedo Servers to use native AWS cloud features, including to scale Tuxedo clusters in conjunction with AWS autoscaling.

SUMMARY

As described herein, a system, method, and computer program are provided for AWS autoscaling of Tuxedo systems. In use, an AWS cloud based deployment of a Tuxedo system is identified. Further, autoscaling of the Tuxedo system is provided in accordance with an autoscaling configuration of the AWS, using a Tuxedo registrar that maps DNS names or internet protocol (IP) addresses with Tuxedo-compliant names capable of being used by the Tuxedo system.

DETAILED DESCRIPTION

Figure 1:
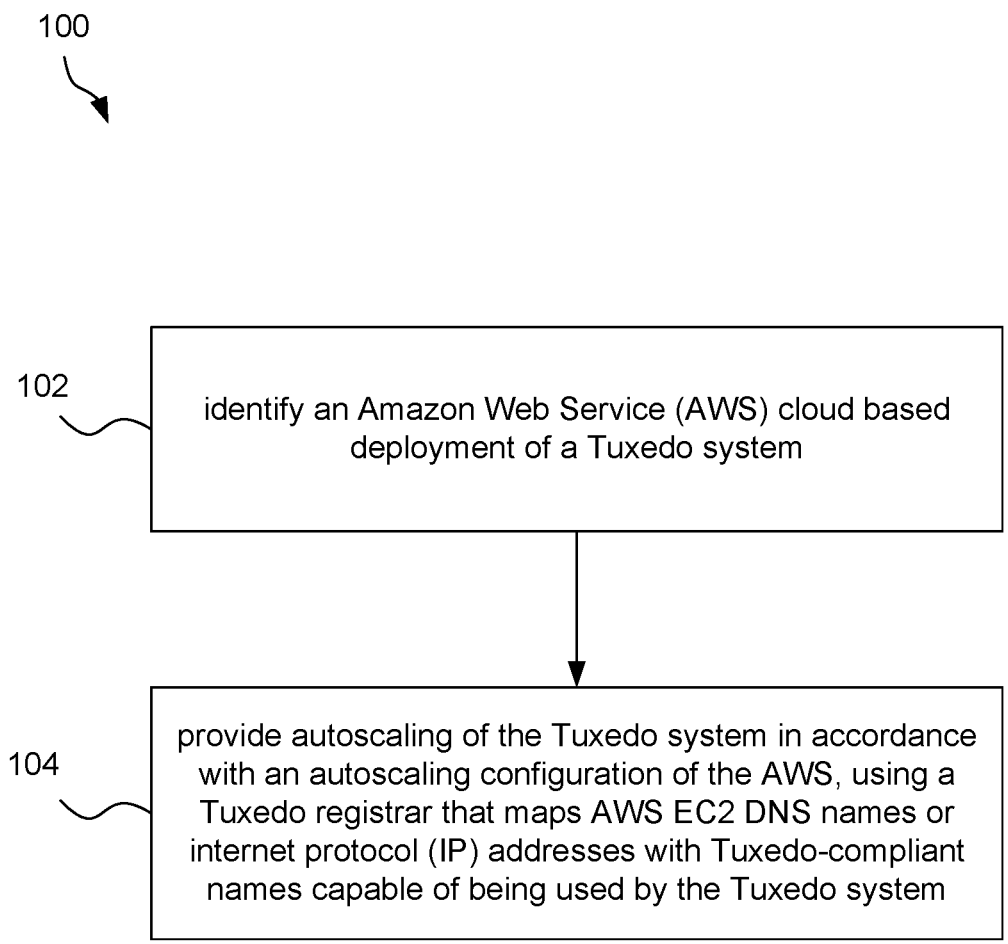
FIG. 1 illustrates a method for providing AWS autoscaling of a Tuxedo system, in accordance with one embodiment.

FIG. 1 illustrates a method 100 for providing AWS autoscaling of a Tuxedo system, in accordance with one embodiment. The method 100 may be performed by any computer system described below with respect to FIGS. 6 and/or 7. For example, the method 100 may be performed by hardware and/or software of the Tuxedo system.

In operation 102, an AWS cloud based deployment of a Tuxedo system is identified. The AWS cloud-based deployment of the Tuxedo system refers to use of one or more resources, including hardware and/or software, of the AWS cloud for deployment (e.g. execution, provisioning, etc.) of the Tuxedo system.

The Tuxedo system includes applications, services, or other computer code that executes in the AWS cloud to provide some functionality. In an embodiment, the Tuxedo system may execute as middleware to provide an interface between one or more client systems and one or more external provider systems. The Tuxedo system may include tuxedo workers or slaves, which would act upon the request that it would receive from the middleware Tuxedo, that also acts as load balancer.

The Tuxedo system may also include a Tuxedo registrar—a new system component—that can generate Tuxedo-compliant names, assign Tuxedo-compliant names to an EC2 instance, register/de-register a Tuxedo worker to tuxedo controller, and have other capabilities to bridge between AWS and Tuxedo standards.

In operation 104, autoscaling of the Tuxedo system is provided in accordance with an autoscaling configuration of the AWS, using the Tuxedo registrar that will generate and assign (map) a Tuxedo-compliant name to the DNS name (or IP address) of the newly added EC2 (machine instance) of the AWS system during the autoscaling process. The DNS names may be used by the AWS or other software to communicate with the Tuxedo system (per AWS protocol), whereas the Tuxedo-compliant names may be used for communications within the Tuxedo system (per Tuxedo protocol). Thus, the registrar may allow the AWS-based communications to be translated for use in the Tuxedo ecosystem, and vice versa.

As indicated, AWS includes an autoscaling configuration feature which allows for autoscaling to be employed by AWS. Autoscaling refers to increasing (scaling up) and decreasing (scaling down) components used for a particular purpose. In the present description, the autoscaling affects (to scale up or down) components of the Tuxedo system.

In one embodiment, auto scaling of the Tuxedo system may include scaling of a number of the Tuxedo workers used by the Tuxedo system. In this case, the autoscaling configuration may include an autoscaling group that defines: a minimum number of the Tuxedo workers required for the Tuxedo system, a maximum number of the Tuxedo workers allowed for the Tuxedo system, and a scaling policy for the Tuxedo workers. The scaling policy for the Tuxedo workers may indicate conditions for scaling the number of the Tuxedo workers used by the Tuxedo system up and for scaling the number of the Tuxedo workers used by the Tuxedo system down.

In another embodiment, autoscaling of the Tuxedo system may include scaling of a number of the Tuxedo containers used by the Tuxedo system. In this case, the autoscaling configuration may include an autoscaling group that defines:

a minimum number of Tuxedo containers required for the Tuxedo system, a maximum number of the Tuxedo containers allowed for the Tuxedo system, and a scaling policy for the Tuxedo containers. The scaling policy for the Tuxedo containers may indicate conditions for scaling the number of the Tuxedo containers used by the Tuxedo system up and for scaling the number of the Tuxedo containers used by the Tuxedo system down.

To this end, the autoscaling may be applied to the Tuxedo workers and the Tuxedo containers. Any AWS-generated addressing (DNS names or IP addresses) assigned by the AWS cloud to the EC2 containers that hosts the Tuxedo system when scaling the Tuxedo system up may be mapped to Tuxedo-compliant names (by the Tuxedo Registrar), for use by the Tuxedo system, such that the autoscaling may be extended to the Tuxedo system in a manner that is functional for the Tuxedo system. For example, where the Tuxedo system does not recognize the DNS names (i.e. is not configured to operate with a format of the DNS names), the Tuxedo system may generate corresponding Tuxedo-compliant names for use by the Tuxedo system.

In one embodiment, providing autoscaling of the Tuxedo system in accordance with the autoscaling configuration of the AWS, using the Tuxedo registrar, may include: responsive to a boot up of a Tuxedo worker in accordance with the autoscaling configuration of the AWS, receiving, by the Tuxedo registrar, a notification of the DNS name assigned to an AWS EC2 instance of the corresponding Tuxedo worker; generating, by the Tuxedo registrar, one of the Tuxedo-compliant names for the Tuxedo worker; storing, by the Tuxedo registrar, the mapping between the one of the DNS names assigned to the Tuxedo worker by the AWS and the one of the Tuxedo-compliant names generated for the Tuxedo worker; and providing, by the Tuxedo registrar, the one of the Tuxedo-compliant names generated for the Tuxedo worker to both the Tuxedo worker and a Tuxedo controller associated with the Tuxedo worker, for use by both the Tuxedo worker and the Tuxedo controller when communicating within the Tuxedo system. In this embodiment, the Tuxedo controller may process client requests using a corresponding group of Tuxedo workers and in accordance with a load balancing policy of the Tuxedo controller.

In a further embodiment, scaling down of the Tuxedo system based on the autoscaling configuration may cause the Tuxedo registrar to deregister any scaled down Tuxedo worker and/or controller. This may be provided as a housekeeping feature for the Tuxedo system.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
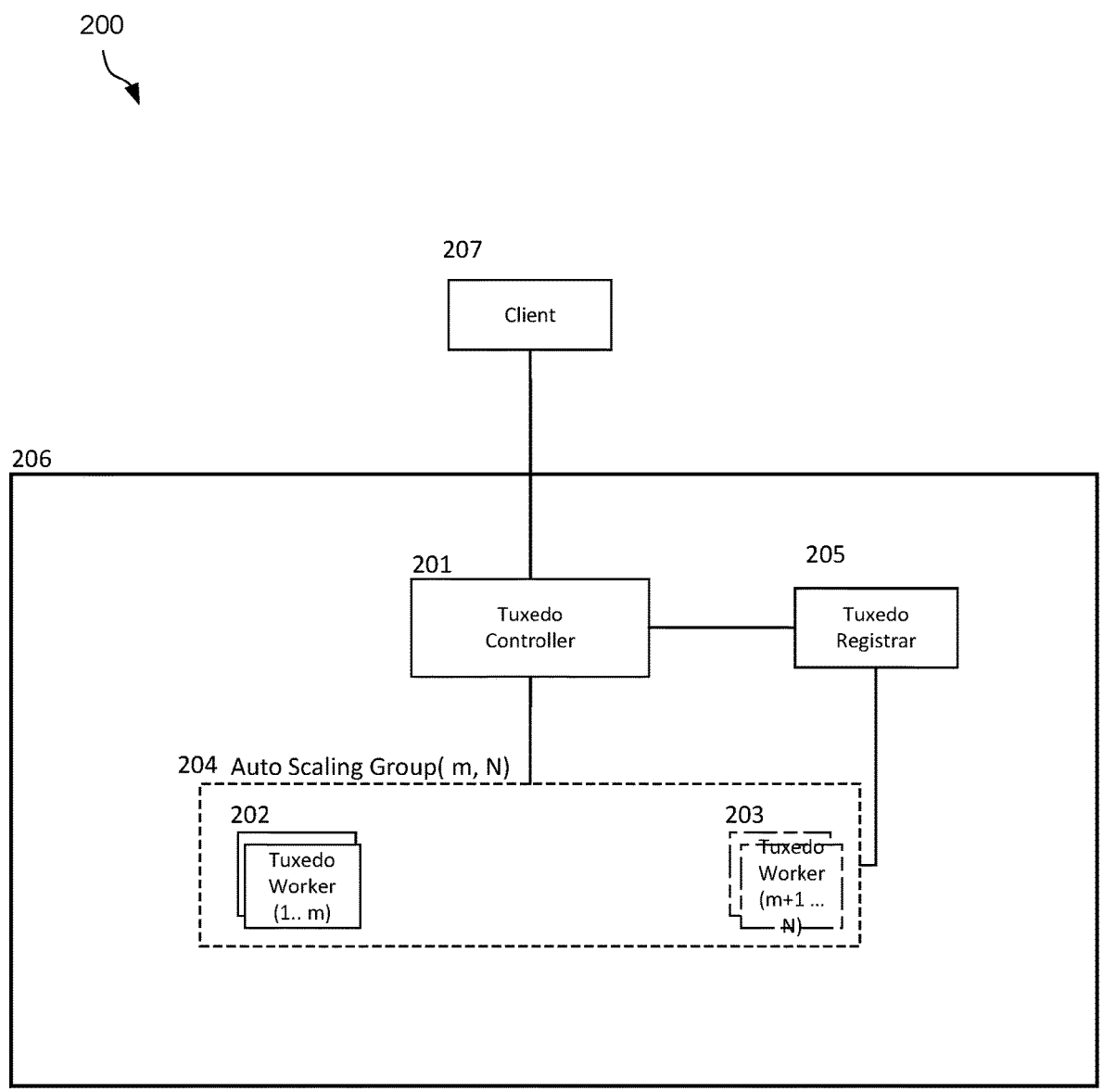
FIG. 2 illustrates a flow diagram of a system for autoscaling Tuxedo workers, in accordance with one embodiment.

FIG. 2 illustrates a flow diagram of a system 200 for autoscaling Tuxedo workers, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

The system 200 includes a Tuxedo container 206 that communicates with a client 207. The Tuxedo container 206 forms an automated sub-system, capable to scale up or scale down tuxedo workers, in conjunction with AWS autoscaling.

A Tuxedo Controller 201 is the centralized controller that would receive a call from a northbound system (client 207) and redirect it to the AWS autoscaling group as described below. The Tuxedo Controller 201 acts as a middleware and load balancer.

One Tuxedo worker, in a set of tuxedo workers in 202, is a single Tuxedo node that would receive a call from the Tuxedo controller 201 and perform a piece of work. The initial system configuration would contain a minimum number of Tuxedo workers 202 (1 . . . m) as defined in the autoscaling group 204 definition.

The Tuxedo workers in 203 in this example embodiment refers to Tuxedo worker(s) that can scale up or down based on the scaling policies defined in the autoscaling group 204. The autoscaling group 204 is defined as per an AWS configuration, and defines, though is not limited to, (m)—the minimum number of Tuxedo workers, (M)—the maximum number of Tuxedo workers, and a (Scaling policy)—e.g. based on central processing unit (CPU) usage, inbound network traffic or any other kind of scaling policy.

The Tuxedo registrar 205 acts as a naming server; it does the following, though is not limited to:

Name generator: The Tuxedo registrar 205 is called by the Tuxedo worker 202, 203 when the system boots or scales up respectively. The Tuxedo registrar 205 takes the DNS name/IP address (Elastic Compute Cloud (EC2) name) generated by AWS to a Tuxedo name format. This translated name and corresponding DNS name/IP address is forwarded to the Tuxedo Controller 201 and the corresponding Tuxedo worker in the Tuxedo cluster 202, 203. The Tuxedo Controller 201 configure the generated name and the DNS name/IP address received from the Tuxedo registrar 205 in its required configuration, as per the defined configuration requirement of the tuxedo in its load balancer form. The worker cluster in 202,203 can use the tuxedo generated names for their internal audits.

Housekeeper: The Tuxedo registrar 205 monitors the Tuxedo worker cluster 202 of the Tuxedo container 206. In the event of a scale down that would happen dynamically based on the defined scaling policies, it is for the Tuxedo registrar 205 to call the Tuxedo Controller 201 and deregister the scaled downed (i.e., stopped) Tuxedo worker cluster 202.

The Tuxedo container 206 represents "one" atomic unit that would have all the needed infrastructure needed by the Tuxedo Controller 201 and Tuxedo workers 202 to process the northbound calls. The client 207 calls the Tuxedo Controller 201 in the cluster (Tuxedo container 206), which would eventually process the request using all the Tuxedo worker cluster 202 as per its load balancing policy. The system scales up triggered due to a policy of the autoscaling group 204, then one or many new Tuxedo worker(s) is spawned, 203, the newly spawned Tuxedo workers are now part of the load balancing and joins the active serving Tuxedo worker cluster, 202 to handle the northbound calls.

Figure 3:
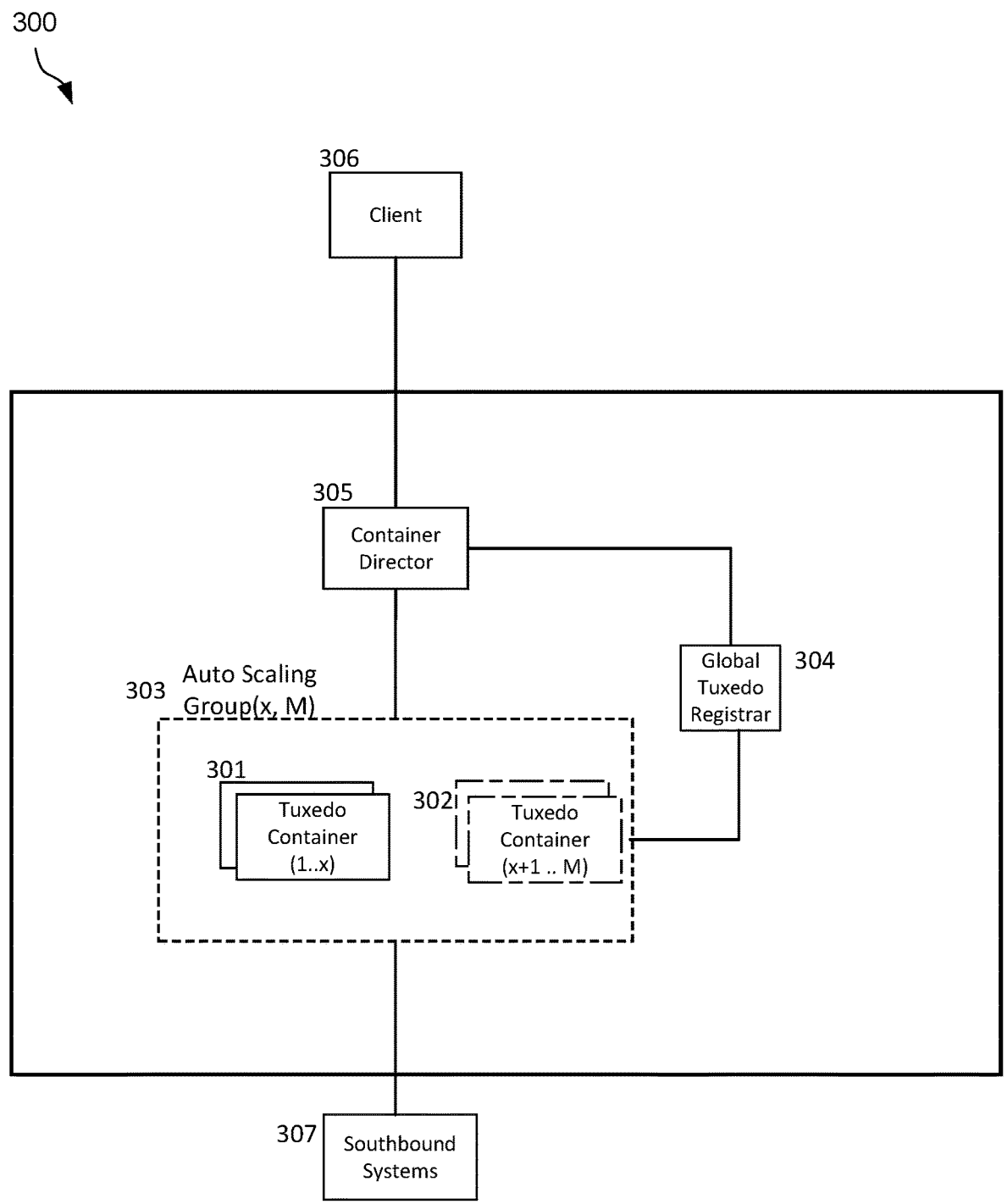
FIG. 3 illustrates a flow diagram of a system for autoscaling Tuxedo containers, in accordance with one embodiment.

FIG. 3 illustrates a flow diagram of a system 300 for autoscaling Tuxedo containers, in accordance with one embodiment. As an option, the system 300 may be implemented in the context of the details of the previous figure and/or any subsequent figure(s). For example, the system 300 may be implemented in the Tuxedo system as a layer that encompasses the system 200 of FIG. 2. Of course, however, the system 300 may be implemented in the context of any desired environment. Further, the aforementioned definitions may equally apply to the description below.

The system 300 depicts a clustered configuration of one-to-many Tuxedo Containers 301, 302 for scaling. The number of atomic Tuxedo Containers 301, 302 (represented as 206 in FIG. 2) is defined by an autoscaling group 303. As an example, this is defined as 1 to x, which implies there are "x" number of Tuxedo Containers 301, 302 (clusters) in the autoscaling group 303. The Tuxedo Containers 301, 302 would receive a call from a Tuxedo Director 305.

The Tuxedo Containers 301, 302 in this example embodiment refers to the number of Tuxedo containers that can scale up or down based on the scaling policies defined in the autoscaling group 303. For instance, if there are "x" current Tuxedo Containers 301, and the system scale up triggers due to a policy of the autoscaling group 303, then a number of new Tuxedo Containers (clusters) let's say "y" is spawned, 302. The new system configuration would now have x+y Tuxedo Containers.

The autoscaling group 303 is defined as per an AWS configuration, and the definition includes, though is not limited to, the following: (x)—the minimum number of Tuxedo Containers 301; (M)—the maximum number of Tuxedo Containers 302; and (Scaling policy)—e.g. based on CPU usage, inbound network traffic or any other kind of scaling policy.

A global Tuxedo registrar 304 acts as a global name service, and is similar to the Tuxedo registrar 205 of FIG. 2. The global Tuxedo registrar 304 does the following, though is not limited to:

Name generator: The global Tuxedo registrar 304 is called by the Tuxedo controller of the Tuxedo Containers 301, 302 when the system boots or scales up. The global Tuxedo registrar 304 translates the DNS name or IP address of the EC2 instance of Tuxedo controller, to a Tuxedo name format. This translated name and corresponding DNS/IP is forwarded to Tuxedo Director 305 for using the generated name and DNS/IP for configuration, and the calling controller for book-keeping, as necessary.

Housekeeper: The global Tuxedo registrar 304 monitors the Tuxedo Container cluster 301. In the event of a scale down that would happen dynamically based on the defined scaling policies, it is for the global Tuxedo registrar 304 to call the Tuxedo Director 305 and deregister the scaled downed (i.e. stopped) Tuxedo worker node.

The Tuxedo Director 305 refers to an example embodiment of the system through which the entire auto scaling group of the Tuxedo clusters would be called. The Tuxedo Director 305 can be, though is not limited to, any load balancers or other northbound systems that would orchestrate calls to the Tuxedo clusters.

The Client 306 in this context refers to the northbound system that would call Tuxedo services. A call may also be made from the Tuxedo Containers 301 to other southbound systems 307 or applications.

Figure 4:
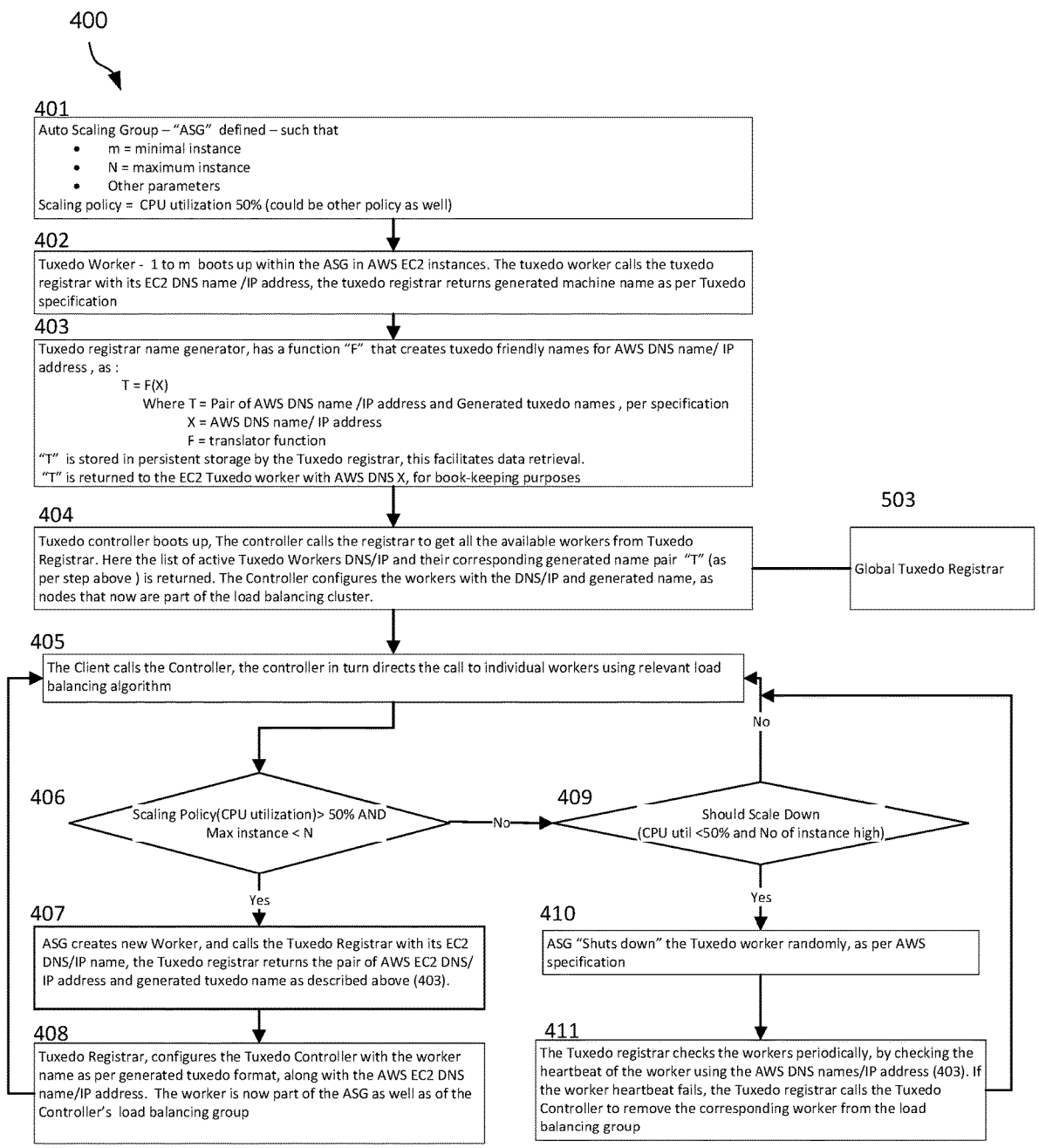
FIG. 4 illustrates a method for autoscaling Tuxedo workers, in accordance with one embodiment.

FIG. 4 illustrates a method 400 for autoscaling Tuxedo workers, in accordance with one embodiment. As an option, the method 400 may be carried out in the context of the details of the previous figure and/or any subsequent figure(s). For example, the method 400 may be carried out in the context of the system 200 of FIG. 2. Of course, however, the method 400 may be carried out in the context of any desired environment. Further, the aforementioned definitions may equally apply to the description below.

The present method 400 describes the Booting, Processing, and Scaling associated with a Tuxedo Container, including the example embodiment of the Lifecycle of scaling up and down the Tuxedo workers within the autoscaling group.

Operations 401-404 illustrate the Boot stage, including how a particular Tuxedo atomic container would start, which would depend on the definition of the autoscaling group. In operation 401, the definition of autoscaling group is identified, which would embody the minimum, maximum, and other parameters for the Tuxedo Container. It would also have the scaling policy defined on the computation, input/output load or other custom policies.

In operation 402, the Tuxedo workers boot up as per the autoscaling group. For example, if the minimum instance is "m" and the max is "M", then a total of "m" worker instances would be instantiated initially. Each of the instances would have the name of the machine as per AWS DNS for the machine deploying the instance.

The "name" in the Tuxedo configuration for this worker must be in the format as per Tuxedo specifications. The use of AWS machine names wouldn't result in the Tuxedo instance to work. Thus, a Tuxedo name equivalent is needed, which is what the Tuxedo registrar generates in operation 403. The returned Tuxedo names and DNS name/IP address from the Tuxedo registrar is used by the Tuxedo instance for book-keeping purpose.

The Tuxedo registrar is the method, process or program that results in a seamless orchestration of Tuxedo and AWS autoscaling. The Tuxedo worker calls the registrar with the AWS DNS name and the registrar generates a corresponding tuxedo name. The mapping of AWS DNS name and generated Tuxedo name is stored within the registrar for future processing. The generated Tuxedo name is passed on to the worker instance.

In operation 404, the controller boots up, and as a part of the booting process it does send its DNS name to the global Tuxedo registrar as described in the method 500 of FIG. 5 below. The global Tuxedo registrar returns a unique Tuxedo friendly name and the corresponding EC2 DNS address/IP address as pair, and this generated name as well as DNS/IP address of the machine for housekeeping. After configuring its own Tuxedo specific name, the next step is getting the participating Tuxedo worker, so that the workers can be configured as load balancing Tuxedo nodes for the controller. The names and DNS/IP of all participating Tuxedo worker nodes are returned by a call to the Tuxedo registrar. Ones the entire configuration is done, the controller boots up. The success of the boot process is the communication between the controller and the Tuxedo workers as was described above in operation 402.

Operation 405 illustrates the Processing stage, where the controller gets the call from the northbound client application and sends it south to the participating Tuxedo workers in the autoscaling group.

In operation 405, the controller process data from client calls, and directs it to the Tuxedo nodes workers in the autoscaling group. If the defined scaling policy is not violated, the system works in the defined state. But if the scaling policy is breached, then upscaling or downscaling within the autoscaling group can occur.

Upscaling: When the defined scaling policy is breached (e.g. CPU utilization) with the autoscaling group, and the current number of Tuxedo workers is less than the maximum defined number of running Tuxedo workers allowed, then the autoscaling group would trigger upscaling, which would increase the number of Tuxedo workers within the autoscaling group.

Downscaling: When the defined scaling parameters are below the defined scaling policy (e.g. to an extent greater than some defined threshold), then the number of Tuxedo workers can be reduced within the autoscaling group.

Upscaling or Scaling Up: This is described in operations 406-408. This flow is triggered when the scaling policy is breached, until the maximum number of configured Tuxedo workers is reached.

In operation 406, an example embodiment of a scaling policy is evaluated. The policy could be defined using different parameters—either simple scaling based on CPU usage or throughput, or could be other custom policies. In this sample embodiment, the CPU usage is treated as a policy parameter. If the autoscaling group with different Tuxedo containers breaches 50% of CPU usage, there is a request to scale up. This effectively would cause a new Tuxedo worker to be created and the needed configuration to be provided for the worker to be part of the autoscaling group, as well as the Tuxedo controller performing load balancing set up.

In operation 407, a new Tuxedo worker node is started. As a part of the preprocessing, the created node sends the AWS DNS name to the Tuxedo controller, like what was done during the initial boot up sequence as described in operation 403.

The Tuxedo registrar, as a part of one of its processing, returns the Tuxedo format name and the corresponding DNS/IP to the Tuxedo worker node. The Tuxedo name is used for book keeping and audit purpose. After the booting process the newly created worker can be accessed by Tuxedo names from the Tuxedo controller, as well as with AWS DNS names from the Tuxedo registrar. This mechanism results in the collaboration of Tuxedo controller and autoscaling group to perform their respective tasks. The created instance is now attached to the autoscaling group, and hence the lifecycle of the Tuxedo Worker is now part of the autoscaling group.

The Tuxedo controller can send across the calls from northbound systems to the Tuxedo worker as shown in operation 408, while the autoscaling group too is able to monitor the Tuxedo worker as its group member.

In operation 408, the Tuxedo registrar configures the Tuxedo controller with the newly created worker(s) from operation 407. Ones this is done, the controller can register the created workers in its load balancing group.

Downscaling or scaling down: This is described in operations 409-411. This flow is triggered by the autoscaling group based on the scaling policy. If the usage is lower than the defined threshold, then this action is triggered to reduce the Tuxedo worker instances in the autoscaling group.

In operation 409, the parameters configured in the scaling policy have a much higher threshold than the current state of those parameters in the system. This is a necessary, although not the only, condition to trigger a scale down. This process would follow the specifications of the autoscaling group, as defined by AWS.

In operation 410, the autoscaling group would detach a random Tuxedo worker from its group. Ones the worker is detached it also needs to be removed from the Tuxedo controller as a part of housekeeping process, as is described in operation 411.

In operation 411, the Tuxedo registrar, as one of its feature embodiments, monitors the detached or stopped Tuxedo workers. The registrar uses the AWS DNS name/IP address to check the Tuxedo workers heartbeat. If the heartbeat is missing for a particular AWS DNS, the corresponding Tuxedo name is used by the registrar to request the Tuxedo controller to remove the corresponding worker from its configuration. Ones the controller does this, the Tuxedo worker is removed from the load balancing configuration of Tuxedo.

This way the entire housekeeping can use the core functionality of both Tuxedo and AWS, the result of which is: (1) Inter Tuxedo communication: The Tuxedo Controller and Tuxedo workers can communicate with each other as per standard tuxedo protocols; and (2) autoscaling group: The autoscaling group can trigger the scale up and scale down processes as per AWS specifications.

Figure 5:
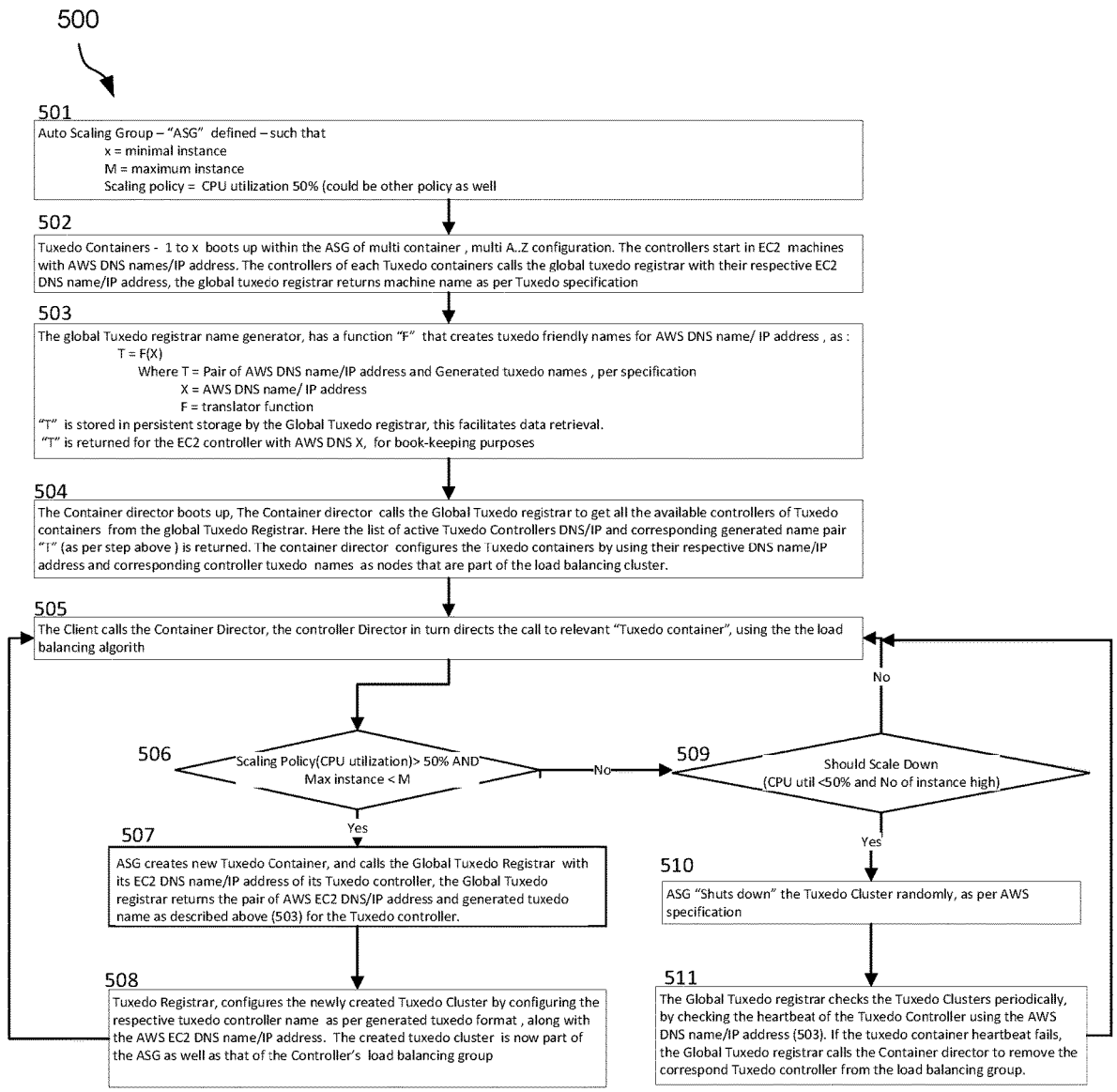
FIG. 5 illustrates a method for autoscaling Tuxedo containers, in accordance with one embodiment.

FIG. 5 illustrates a method 500 for autoscaling Tuxedo containers, in accordance with one embodiment. As an option, the method 500 may be carried out in the context of the details of the previous figure and/or any subsequent figure(s). For example, the method 500 may be carried out in the context of the system 300 of FIG. 3. Of course, however, the method 500 may be carried out in the context of any desired environment. Further, the aforementioned definitions may equally apply to the description below.

The present method 500 describes the Booting, Processing, and Scaling associated with a Tuxedo Container, including the example embodiment of the Lifecyle of scaling up and down the Tuxedo containers within the autoscaling group.

Operations 501-504 illustrates the Boot stage, including how a particular Tuxedo container director would start, which would depend on the definition of the autoscaling group.

In operation 501, the definition of autoscaling group is identified, which would define the minimum, maximum, and other parameters for Tuxedo containers. It would also have the scaling policy defined on the computation, input/output load or other custom policies.

In operation 502, the Tuxedo containers boot up as per the autoscaling group. For example, if the minimum number of instances is "x" and the max is "M", then a total of "x" Tuxedo container instances would be instantiated. Each of the container instances here would have the name of the corresponding Tuxedo controller machine as per AWS DNS for the machine. The "name" in the Tuxedo director for this Tuxedo container would be that of the corresponding Tuxedo controller, and the controller must be in the format as per Tuxedo specifications.

As described above in operation 402 of FIG. 4, AWS DNS can't be used to configure a Tuxedo instance. There is a need to have a Tuxedo specified naming convention for the instance, which is what the Global Tuxedo registrar does as described below in operation 503.

In operation 503, the global Tuxedo registrar, works similar to the Tuxedo registrar described in operation 403 of FIG. 4, which is the method, process or program that results in a seamless orchestration of Tuxedo and AWS autoscaling. The Tuxedo controller of each individual Tuxedo container calls the global Tuxedo registrar with the controllers AWS DNS name and the global Tuxedo registrar generates a corresponding Tuxedo friendly name. The mapping of AWS DNS name and generated Tuxedo friendly name is stored within the global Tuxedo registrar for future processing. The generated Tuxedo name is passed on to the Tuxedo controller instance.

In operation 504, the container director boots up, and as a part of the booting process it does send its internet protocol (IP) address to the global Tuxedo registrar as described below. After configuring its own Tuxedo specific name, as returned from the global Tuxedo registrar, the other process is to get the participating Tuxedo worker for load balancing. This can be done by a calling to the Tuxedo registrar. Ones the entire configuration is done, the controller boots up.

Also in operation 504 when the container director boots up, as a part of the booting process the director gets the participating Tuxedo containers by calling the global Tuxedo registrar, to configure the Tuxedo containers in the load balancing group. The success of the boot process is the communication between the controller director and the Tuxedo containers seamlessly.

Operation 505 illustrates the Processing stage, where the controller director gets the call from the northbound client application and sends it south to the participating Tuxedo container(s) in the autoscaling group.

In operation 505, the controller director process data from client calls, and directs it to the Tuxedo containers within the auto scaling group. The call can be forwarded as the controller director holds the names and the DNS/IP of the Tuxedo controllers of each Tuxedo container instance. As the call is transferred to the Tuxedo controller, the controller itself then directs it to the Tuxedo workers, as described in operation 405 of FIG. 4. If the controller director defined auto scaling policy is not violated, the system works in the defined state. But if the scaling policy is breached then one of the following can happen within the autoscaling group:

Upscaling: When the defined scaling policy is breached, such as CPU utilization within the autoscaling group, and the current instance is less than the maximum running instances, then the autoscaling group would trigger upscaling, which would increase the number of Tuxedo containers within the autoscaling group.

Downscaling: When the defined scaling parameters are below the defined scaling policy (e.g. to an extent greater than some defined threshold), then the number of Tuxedo containers can be reduced within the autoscaling group.

Operations 506-508 illustrate Upscaling or Scaling Up, which is triggered when the scaling policy is breached, until the maximum number of configured Tuxedo containers is reached.

In operation 506, an example embodiment of a scaling policy is evaluated. It is the same as in operation 406 of FIG. 4, as an example.

In operation 507, a new Tuxedo container is started. As a part of the preprocessing, the created Tuxedo container sends the AWS EC2 DNS name/IP address to the controller director, like what was done during the initial boot up sequence as described in operation 503.

The global Tuxedo registrar, as a part of one of its processing, returns the Tuxedo friendly name format and the DNS address/IP address pair to the Tuxedo controller node, of the corresponding Tuxedo container. The Tuxedo name is for bookkeeping only. After the booting process the newly created Tuxedo container can be accessed by Tuxedo names of the Tuxedo controller from the container director, as well as with AWS DNS names from the Global Tuxedo registrar. This mechanism results in the collaboration of controller director and autoscaling group to perform their respective tasks. The created instance is now attached to the autoscaling group, and hence the lifecycle of the Tuxedo container is now part of the autoscaling group.

The controller director can send across the calls from northbound systems to the Tuxedo container as shown in operation 508, while the autoscaling group too is able to monitor the Tuxedo container as one of its group members.

In operation 508, the global Tuxedo registrar configures the controller director with the newly created Tuxedo container from operation 507. Once this is done, the controller director can register the created Tuxedo container by configuring the Tuxedo container in the controller directors load balancing group.

Operations 509-511 illustrate Downscaling or scaling down, which is triggered by the autoscaling group based on the scaling policy. If the usage is lower than the defined threshold, then this action is triggered to reduce the Tuxedo container instances in the autoscaling group.

Operation 509 is similar to operation 409 of FIG. 4, although different parameters of the scaling policy can be configured.

In operation 510, the autoscaling group would detach a random Tuxedo container (the proxy of the container is the Tuxedo controller) from its group. Once the Tuxedo container is detached, it also needs to be removed from the controller director as a part of a housekeeping process, as is described in operation 511.

In operation 511, the global Tuxedo registrar, as one of its feature embodiments, monitors the detached or stopped Tuxedo containers. The global Tuxedo registrar uses the AWS DNS name/IP address to check the Tuxedo container's heartbeat. The heartbeat of the container is ascertained through the Tuxedo controller of the container. If the heartbeat is missing for a particular AWS DNS, the corresponding Tuxedo name is used by the global Tuxedo registrar to request the controller director to remove the corresponding Tuxedo controller (and hence the Tuxedo cluster) from its configuration. Ones the controller director does this, the Tuxedo container is removed from the load balancing configuration.

This way the entire housekeeping can use the core functionality of both Tuxedo and AWS, the result of which is: (1) Tuxedo communication: The Controller director and Tuxedo containers can communicate with each other as per any communication embodiment, and (2) autoscaling group: The autoscaling group can trigger the scale up and scale down processes as per AWS specifications.

Figure 6:
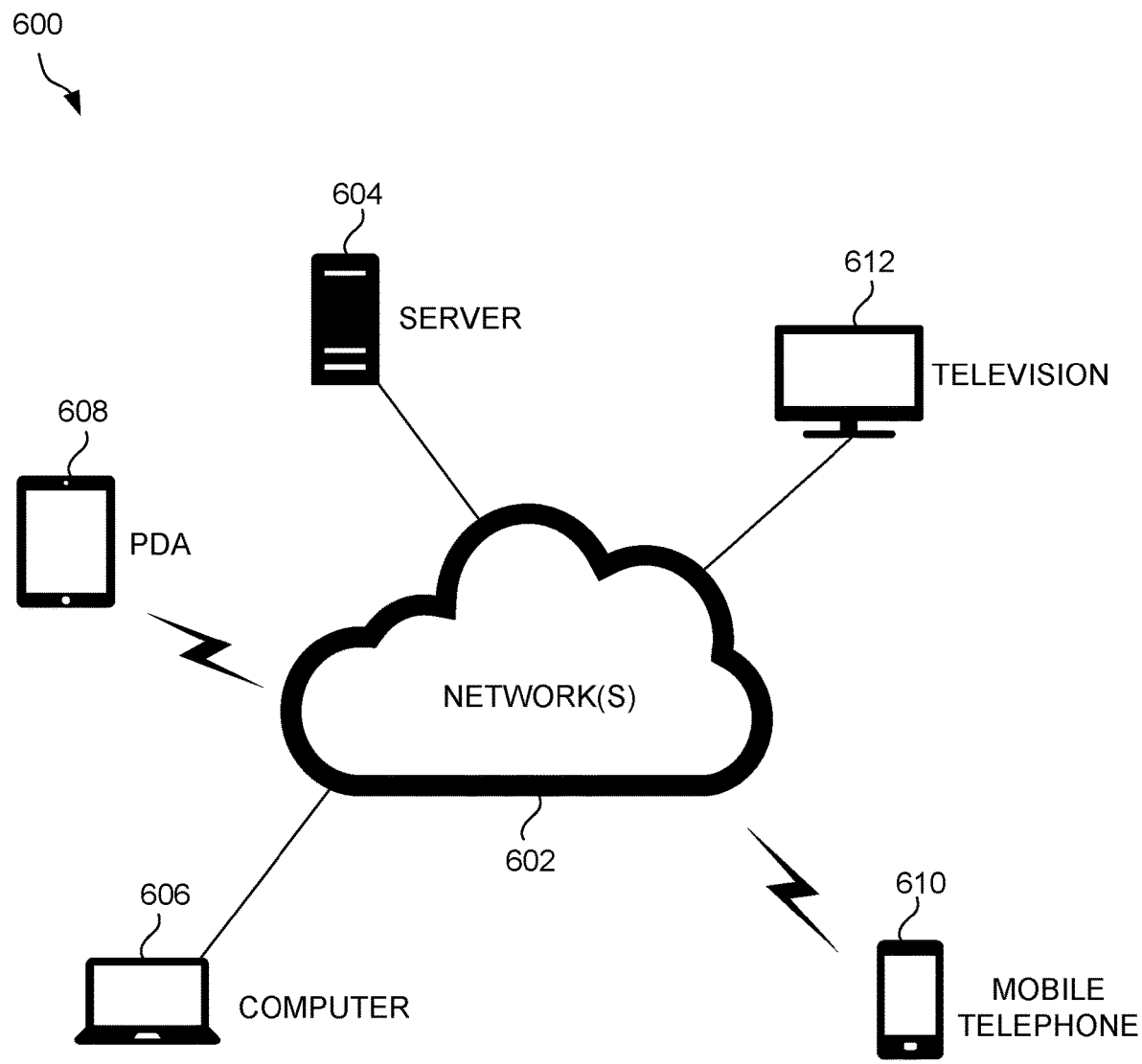
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
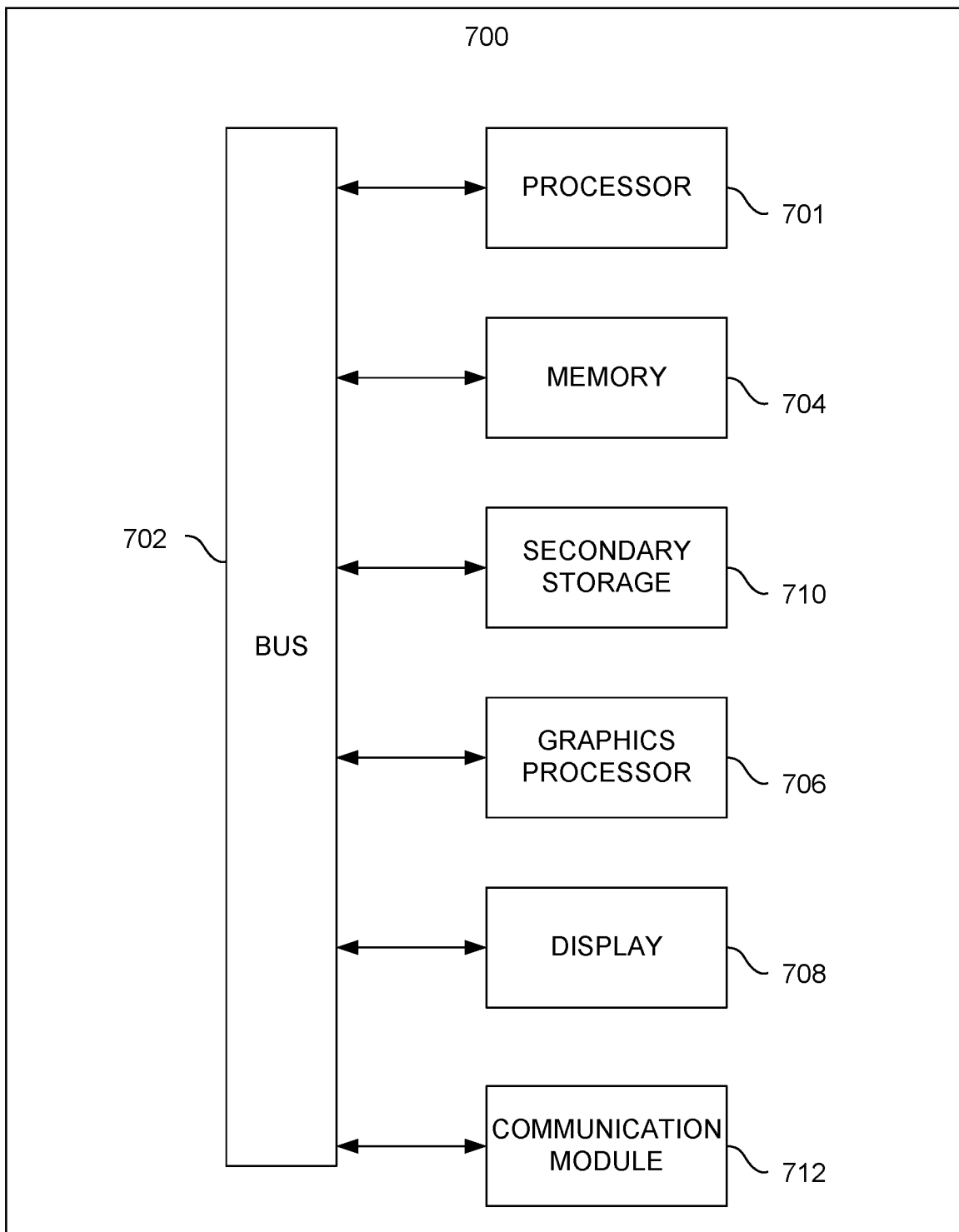
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   identify an Amazon Web Service (AWS) cloud based deployment of a Tuxedo system; and
   provide autoscaling of the Tuxedo system in accordance with an autoscaling configuration of the AWS, using a Tuxedo registrar that maps AWS EC2 DNS names or Internet protocol (IP) addresses with Tuxedo-compliant names capable of being used by the Tuxedo system, including:
   responsive to a boot up of a Tuxedo worker in accordance with the autoscaling configuration of the AWS, receiving, by the Tuxedo registrar, a notification of one of the AWS EC2 DNS names or IP addresses assigned to the Tuxedo worker by the AWS;
   generating, by the Tuxedo registrar, one of the Tuxedo-compliant names for the Tuxedo worker;
   storing, by the Tuxedo registrar, the mapping between the one of the DNS names or IP addresses assigned to the Tuxedo worker by the AWS and the one of the Tuxedo-compliant names generated for the Tuxedo worker;
   providing, by the Tuxedo registrar, the one of the Tuxedo-compliant names generated and corresponding the EC2 DNS name or IP address for the Tuxedo worker to both the Tuxedo worker and a Tuxedo controller associated with the Tuxedo worker, for use by both the Tuxedo worker and the Tuxedo controller when communicating within the Tuxedo system.

2. The non-transitory computer-readable media of claim 1, wherein the Tuxedo system includes Tuxedo workers that process tasks.

3. The non-transitory computer-readable media of claim 2, wherein autoscaling of the Tuxedo system includes scaling of a number of the Tuxedo workers used by the Tuxedo system.

4. The non-transitory computer-readable media of claim 3, wherein the autoscaling configuration of the AWS includes an autoscaling group that defines:
   a minimum number of the Tuxedo workers required for the Tuxedo system,
   a maximum number of the Tuxedo workers allowed for the Tuxedo system, and
   a scaling policy for the Tuxedo workers.

5. The non-transitory computer-readable media of claim 4, wherein the scaling policy for the Tuxedo workers indicates conditions for scaling the number of the Tuxedo workers used by the Tuxedo system up and for scaling the number of the Tuxedo workers used by the Tuxedo system down.

6. The non-transitory computer-readable media of claim 1, wherein the Tuxedo system includes Tuxedo containers that control independent groups of Tuxedo workers.

7. The non-transitory computer-readable media of claim 6, wherein autoscaling of the Tuxedo system includes scaling of a number of the Tuxedo containers used by the Tuxedo system.

8. The non-transitory computer-readable media of claim 7, wherein the autoscaling configuration of the AWS includes an autoscaling group that defines:
   a minimum number of Tuxedo containers required for the Tuxedo system,
   a maximum number of the Tuxedo containers allowed for the Tuxedo system, and
   a scaling policy for the Tuxedo containers.

9. The non-transitory computer-readable media of claim 8, wherein the scaling policy for the Tuxedo containers indicates conditions for scaling the number of the Tuxedo containers used by the Tuxedo system up and for scaling the number of the Tuxedo containers used by the Tuxedo system down.

10. The non-transitory computer-readable media of claim 1, wherein the Tuxedo controller processes client requests using a corresponding group of Tuxedo workers and in accordance with a load balancing policy of the Tuxedo controller.

11. The non-transitory computer-readable media of claim 1, further comprising:
   responsive to scaling down of the Tuxedo system, causing, by the Tuxedo registrar, any scaled down Tuxedo worker to be deregistered.

12. The non-transitory computer-readable media of claim 1, wherein Tuxedo-compliant names are used for communications within the Tuxedo system.

13. The non-transitory computer-readable media of claim 1, wherein the AWS EC2 DNS names or IP addresses are used by the AWS to communicate with the Tuxedo system.

14. A method, comprising:
   by a computer system:
   identifying an Amazon Web Service (AWS) cloud based deployment of a Tuxedo system; and
   providing autoscaling of the Tuxedo system in accordance with an autoscaling configuration of the AWS, using a Tuxedo registrar that maps AWS EC2 DNS names or internet protocol (IP) addresses with Tuxedo-compliant names capable of being used by the Tuxedo system, including:
   responsive to a boot up of a Tuxedo worker in accordance with the autoscaling configuration of the AWS, receiving, by the Tuxedo registrar, a notification of one of the AWS EC2 DNS names or IP addresses assigned to the Tuxedo worker by the AWS;
   generating, by the Tuxedo registrar, one of the Tuxedo-compliant names for the Tuxedo worker;
   storing, by the Tuxedo registrar, the mapping between the one of the DNS names or IP addresses assigned to the Tuxedo worker by the AWS and the one of the Tuxedo-compliant names generated for the Tuxedo worker;
   providing, by the Tuxedo registrar, the one of the Tuxedo-compliant names generated and corresponding the EC2 DNS name or IP address for the Tuxedo worker to both the Tuxedo worker and a Tuxedo controller associated with the Tuxedo worker, for use by both the Tuxedo worker and the Tuxedo controller when communicating within the Tuxedo system.

15. A system, comprising:
   a non-transitory memory storing instructions; and
   one or more processors in communication with the non-transitory memory that execute the instructions to:
   identify an Amazon Web Service (AWS) cloud based deployment of a Tuxedo system; and
   provide autoscaling of the Tuxedo system in accordance with an autoscaling configuration of the AWS, using a Tuxedo registrar that maps AWS EC2 DNS names or Internet protocol (IP) addresses with Tuxedo-compliant names capable of being used by the Tuxedo system, including:

responsive to a boot up of a Tuxedo worker in accordance with the autoscaling configuration of the AWS, receiving, by the Tuxedo registrar, a notification of one of the AWS EC2 DNS names or IP addresses assigned to the Tuxedo worker by the AWS;

generating, by the Tuxedo registrar, one of the Tuxedo-compliant names for the Tuxedo worker;

storing, by the Tuxedo registrar, the mapping between the one of the DNS names or IP addresses assigned to the Tuxedo worker by the AWS and the one of the Tuxedo-compliant names generated for the Tuxedo worker;

providing, by the Tuxedo registrar, the one of the Tuxedo-compliant names generated and corresponding the EC2 DNS name or IP address for the Tuxedo worker to both the Tuxedo worker and a Tuxedo controller associated with the Tuxedo worker, for use by both the Tuxedo worker and the Tuxedo controller when communicating within the Tuxedo system.

16. The system of claim 15, wherein the Tuxedo system includes Tuxedo workers that process tasks.

17. The system of claim 16, wherein autoscaling of the Tuxedo system includes scaling of a number of the Tuxedo workers used by the Tuxedo system.

18. The system of claim 15, wherein the Tuxedo system includes Tuxedo containers that control independent groups of Tuxedo workers.

19. The system of claim 18, wherein autoscaling of the Tuxedo system includes scaling of a number of the Tuxedo containers used by the Tuxedo system.

\* \* \* \* \*